Jan. 22, 1929.  
J. O. SHEPHERD  
1,699,759  
ELECTRICAL METERING SYSTEM  
Filed April 21, 1924 3 Sheets-Sheet 1

WITNESSES:

INVENTOR  
Judson O. Shepherd  
BY  
ATTORNEY

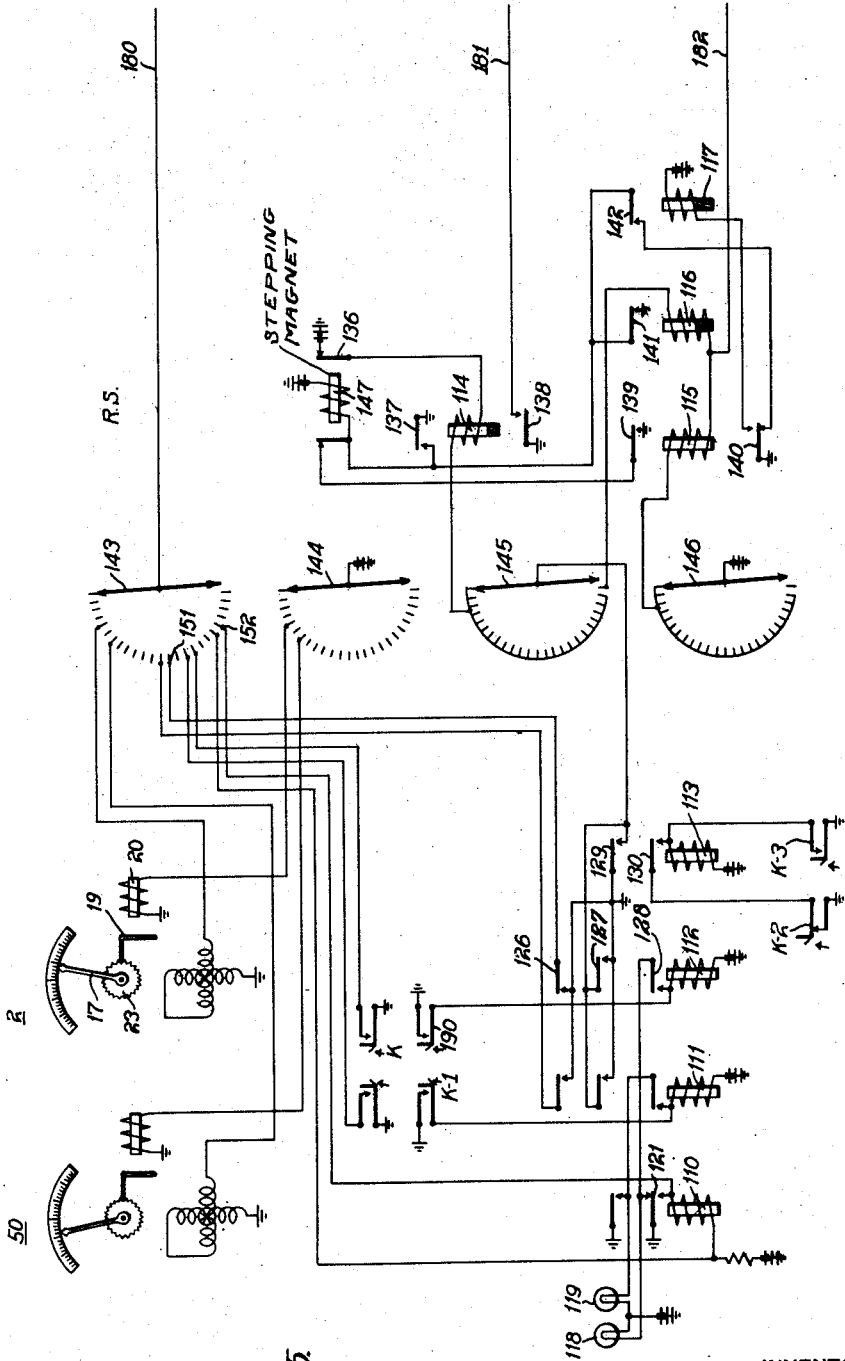

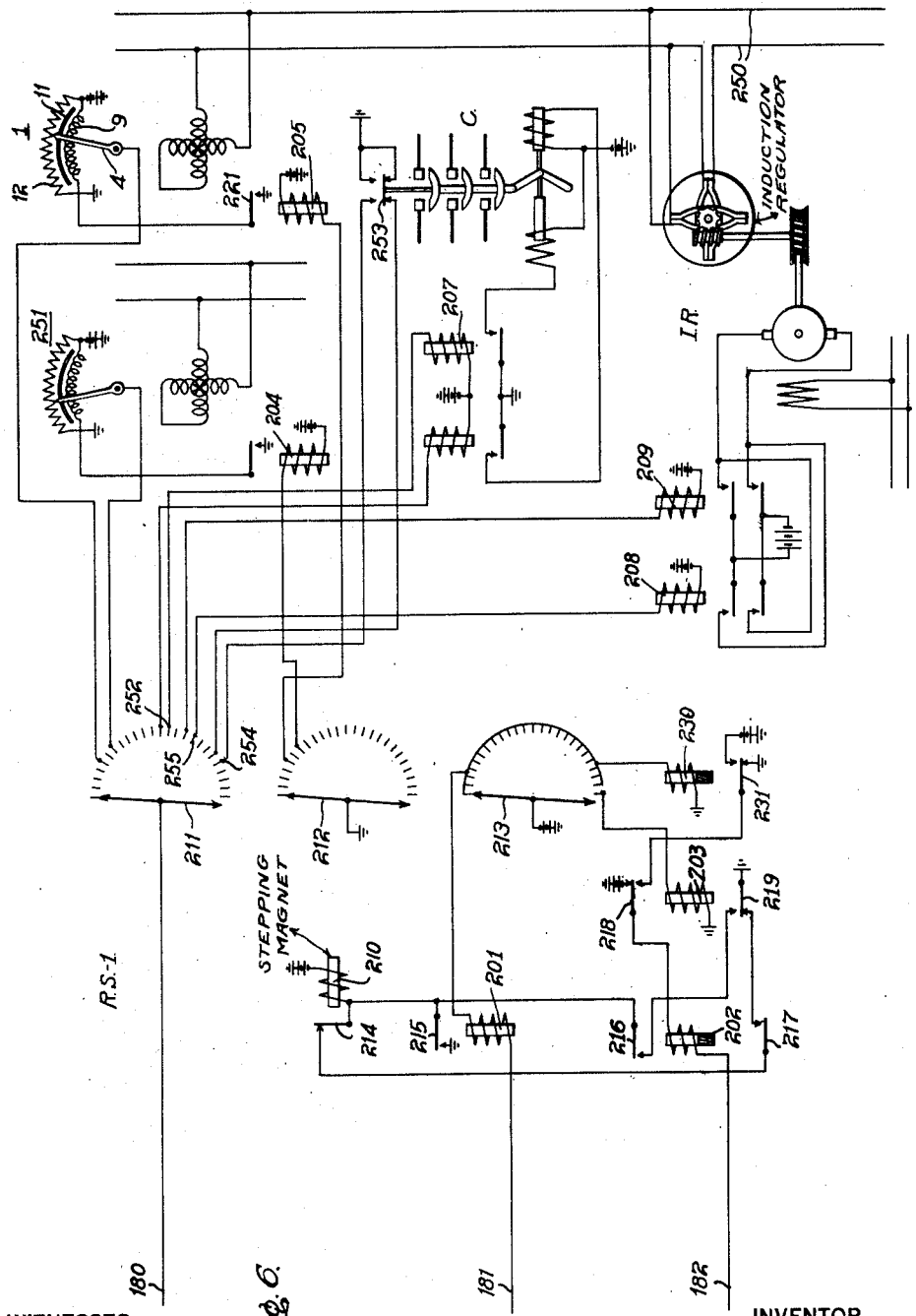

Patented Jan. 22, 1929.

1,699,759

UNITED STATES PATENT OFFICE.

JUDSON O. SHEPHERD, OF ATLANTA, GEORGIA.

ELECTRICAL METERING SYSTEM.

Application filed April 21, 1924. Serial No. 708,100.

My invention relates to electrical metering systems and particularly to electrical metering systems for supervisory controlling installations.

One of the objects of my invention is to provide an electrical metering system that shall be adapted to produce indications at a dispatcher's office of the power used in circuits at a remote station over the same circuit as is used for controlling and supervising power apparatus at such remote station.

Another object of my invention is to provide means for periodically checking, from the dispatcher's office, the load on circuits at the remote station.

A further object of my invention is to provide means for so supervising and controlling power apparatus at a remote station that the voltage on any circuit thereat may be regulated as desired.

Other objects of the invention, together with those mentioned above, will be hereinafter described.

In practicing my invention, I provide a trunk line comprising three conductors connecting the dispatcher's office with a substation. At the substation, a sending meter is associated with any desired circuit. Selector switches, of a type well known in the telephone art, are provided at both the substation and the dispatcher's office. At the dispatcher's office, I provide a receiving or registering meter. I provide also, at the dispatcher's office, a number of keys, one for each of the apparatus units that it is desired to control, and a plurality of lamps, two for each apparatus unit. These lamps indicate the condition of the corresponding unit at the station.

Referring now to the drawings,

Figs. 5 and 6 show, by means of the conventional circuit diagrams, sufficient of the apparatus and circuits to enable my invention to be readily explained and understood.

The apparatus shown in Fig. 5 is that located at the dispatcher's office, while the apparatus shown in Fig. 6 is that located at the substation.

In the measuring system embodying my invention, I provide selector switches RS and RS—1 located at the dispatcher's office and at the substation, respectively. I employ also, at the substation a meter device 1 that is connected in circuit with the selector switch RS—1. A repeating meter 2 is connected in circuit with the selector switch RS at the dispatcher's office.

The selector switches are of the ordinary type, and control circuits are so provided that the wipers of these switches are rotated in synchronism over their associated bank contacts. Inasmuch as the sending and receiving means are periodically connected together by the operation of the selector switches, the current flow over the trunk line at this time is so varied as to operate the receiving meter to indicate the reading of the sending meter. In other positions of the wipers of the selector switches, other metering indications may be sent, or apparatus units may be controlled and supervised.

Figure 1:
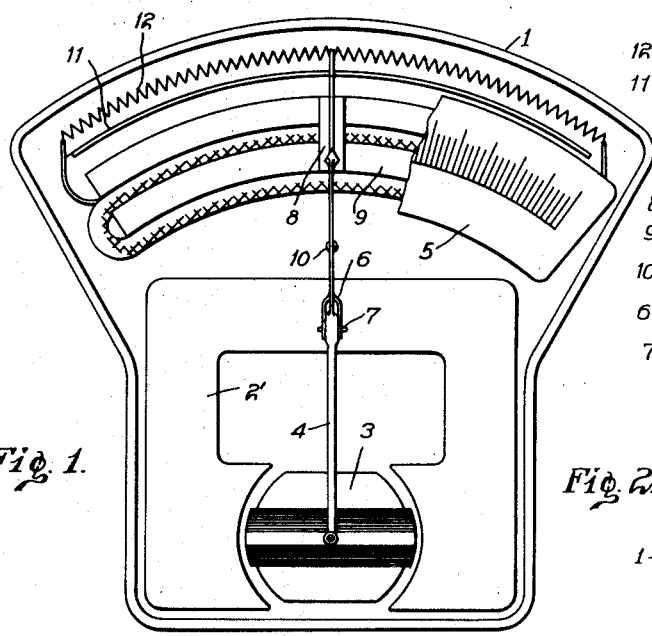
Figure 1 is a front elevational view of the sending meter at the station or substation.
Figure 2:
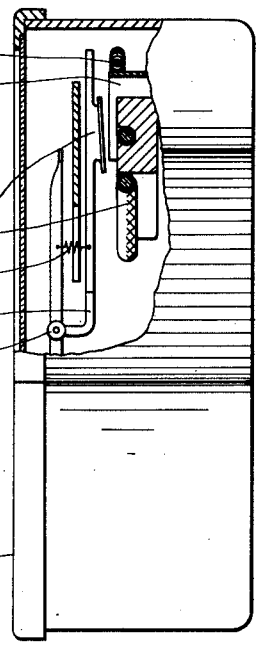
Fig. 2 is a side view, partly in section, of the same device.

Referring now more particularly to Figs. 1 and 2, the device 1 is an ordinary voltmeter slightly modified in accordance with features of my invention. The voltmeter 1 comprises a permanent magnet 2' and an armature 3. A pointer 4 is attached to the armature 3. The pointer 4 indicates, upon a scale 5, the voltage of the electric current in the circuit to which it is connected. An extension 6 is attached to the pointer arm 4 and is pivoted at 7.

The arm 6 is so formed that, when in position, it is adapted to move under the scale 5 under control of the armature 3. The arm 6 forms an armature 8 for an electromagnet 9. The electromagnet 9 extends all the way across the front of the voltmeter. The armature 8 is retained in its normal position by a spring 10.

When the electromagnet 9 is energized, the armature 8 is attracted and contact is made between a collector bar 11 and a voltage divider 12. Both the collector bar 11 and the potentiometer coil extend across the front of the instrument in the manner shown.

Figure 3:
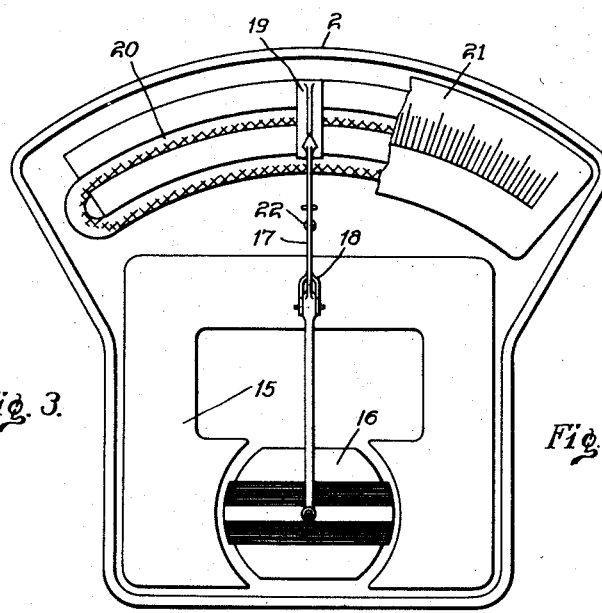
Fig. 3 is a front elevational view of the receiving meter at the dispatcher's office.
Figure 4:
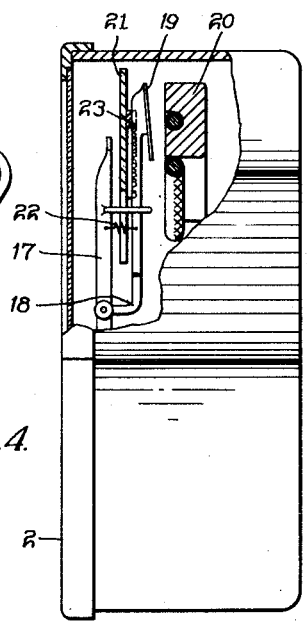
Fig. 4 is a side view, partly in section, of the same meter.

Referring now to Fig. 3, the repeating meter 2 is constructed from an ordinary voltmeter in a manner somewhat similar to the sending meter 1. The repeating meter 2 is provided with a permanent magnet 15, an armature 16 and a pointer 17 that is attached to the armature. An extension bar 18 is attached to the pointer 17 and forms an armature 19 for an electromagnet 20. The electromagnet 20 extends across the front of the voltmeter in the manner shown.

The armature 19 moves behind the scale 21 and is maintained in retracted position by a spring 22. In the retracted position, the armature 19 engages a notch in a rack 23. This rack also extends across the front of the voltmeter 2. Whenever the electromagnet 20 is energized, the armature 19 is drawn out of engagement with the notch in the rack 23 and the pointer 17 is free to move under the influence of the armature 16 of the voltmeter. When the magnet is deenergized, the armature 19 is retracted by the spring 22 and, consequently, engages a notch in the rack 23, and the pointer 17 is thus maintained in the position to which the spring 22 in the armature 16 has operated it.

In Fig. 5, keys K and K—1 are of the ordinary double-throw type well known in the telephone art. Relays 110 to 113, inclusive, control the operation of supervisory lamps 118 and 119 and also of a selector switch RS. Keys K—2 and K—3 are of the ordinary type and are so-called single-throw keys. The selector switch RS is of the usual type of rotary switch, being provided with wipers 143 to 146, inclusive, each of which is adapted to engage a contact bank of twenty-five contacts. The wipers of the selector switch RS move in a forward direction only. The mechanical construction of this switch is similar to the switch shown in Clement Patent No. 1,107,153.

In Fig. 6, a selector switch RS—1 is similar to the selector switch RS, previously described, and comprises wipers 211 to 213, inclusive, each of which is adapted to engage a contact bank of twenty-five contacts. At IR is shown an ordinary form of induction regulator that is adapted to control the voltage applied to the circuit 250. A circuit breaker C of the ordinary type is adapted to be selected by the selector switch RS—1. The sending meter 1 measures the voltage of the electric current in the circuit 250 and is also accessible to the selector switch RS—1, as is the sending meter 251.

Having described the apparatus shown in the drawings, I will now explain its detailed operation. For this purpose, it will be assumed that the dispatcher desires to ascertain the load on the circuit 250 at the substation. In order to initiate the operation of the selector switches, the dispatcher will operate the key K—3, whereby a circuit is completed for the relay 113. This relay, upon being operated, establishes a locking circuit for itself at armature 130 and completes a circuit extending from ground by way of armature 129 and its front contact, wiper 145, bank contact with which said wiper is in engagement, winding of slow-releasing relay 114, and armature 136 and its back contact to battery.

The slow-releasing relay 114 is energized over the above circuit and completes a circuit, at armature 137, for the stepping magnet 147. The stepping magnet 147 operates to so position its pawl as to actuate the switch shaft carrying the wipers 143 to 146, inclusive, upon being deenergized, and, at armature 136, opens the circuit of the slow-releasing relay 114.

The slow-releasing relay 114 is deenergized after an interval of time and opens the circuit of the stepping magnet 147. The magnet 147 retracts its armature, thereby advancing the switch wipers 143 to 146, inclusive, into engagement with their second set of bank contacts. Another result of the deenergization of magnet 147 is that a circuit is again completed for the slow-releasing relay 114.

Upon the first energization of the relay 114, a circuit is also closed at armature 138 extending from ground by way of said armature and its front contact, trunk conductor 181, winding of relay 201, bank contact with which wiper 213 is in engagement, and said wiper to battery. The relay 201 is energized over the above circuit and operates to close the circuit of the stepping magnet 210 at armature 215. The stepping magnet 210 operates to place its pawl in such position as to actuate the switch shaft carrying the switch wipers 211 to 213, inclusive, upon being deenergized.

When the slow-releasing relay 114, at the dispatcher's office, is deenergized, as described, the circuit of the relay 201 is opened and this relay retracts its armature to open the circuit for the stepping magnet 210. The stepping magnet 210 operates to advance the wipers 211 to 213, inclusive, into engagement with their first set of bank contacts.

At the dispatcher's office, the relay 114 operates to again close the circuit of the magnet 147 and to complete the circuit of the relay 201. The wipers 143 to 146, inclusive, of the rotary switch RS and the wipers 211 to 213, inclusive, of the rotary switch RS—1 are thus advanced in synchronism, step by step, in the manner described. This operation takes place until the switch wipers of the rotary switch RS are brought into engagement with the twenty-fifth set of bank contacts. In this position, at the wiper 145, the circuit of the slow-releasing relay 114 is opened and the rotation of the wipers of the switch RS ceases.

During the movement of the wipers of the switch RS—1, the slow-acting relay 230 is energized. Now, if the wipers 211 to 213, inclusive, engage their twenty-fifth set of bank contacts at the same time the wipers 143 to 146, inclusive, of the switch RS engage their twenty-fifth set of bank contacts, the circuit of the relay 230 is opened at this time and a circuit is closed for the relay 203. A circuit is now closed that extends from ground by way of armature 129 and its front contact, wiper 145, twenty-fifth bank contact, winding of relay 116, trunk conductor 182, winding of slow-releasing relay 202, armature 218 and its front contact, and armature 231 and its front contact to battery. The relays 116 and 202 are energized over this circuit.

The slow-releasing relay 116, upon being operated, at armature 141 completes a circuit for the stepping magnet 147. The stepping magnet 147 is energized to position its pawl in the manner before described. The slow-releasing relay 202, upon being energized, completes a circuit for the stepping magnet 210 over a path extending from ground by way of armature 219 and its front contact, front contact and armature 216, and winding of stepping magnet 210 to battery. The stepping magnet 210 operates over this circuit to position its pawl.

The slow-releasing relay 230 is deenergized after an interval of time and the circuit of the relays 116 and 202 is opened. These relays deenergize after a short interval of time to open the circuit of the magnets 147 and 210, respectively. The magnet 147 operates to advance the wipers 143 to 146, inclusive, into engagement with their first set of bank contacts. The operation of the magnet 210 operates to advance the wipers 211 to 213, inclusive, into engagement with their first set of bank contacts.

In the event that the wipers 143 to 146, inclusive, of the rotary switch RS are operated into engagement with their twenty-fifth set of bank contacts before the wipers 211 to 213, inclusive, are operated into engagement with this set of bank contacts, the operation of the magnet 147 ceases as the circuit of the slow-releasing relay 114 is opened. In addition, a circuit is completed extending from ground by way of armature 129 and its front contact, wiper 145, the twenty-fifth bank contact, winding of relay 116, trunk conductor 182, winding of relay 202, and armature 218 and its bank contact to battery.

The relay 116 operates to complete a circuit for the magnet 147. The magnet 147 operates to place its pawl in position to actuate the switch shaft.

The relay 202, upon being energized, at armature 217 completes a circuit extending from ground by way of armature 219 and its back contact (the relay 203 being deenergized), front contact and armature 217, back contact and armature 214 and winding of magnet 210 to battery. As the magnet 210 interrupts its own circuit, it operates as a buzzer to advance the switch wipers 211 to 213, inclusive, until these wipers are brought into engagement with the twenty-fifth set of bank contacts, whereupon the relay 203 is energized. The operation of this relay serves to open the self-interrupting circuit of the stepping magnet 210 and to complete a circuit at the front contact of armature 219 for the magnet 210.

The operation of the armature 218 of the relay 203 also opens the circuit of the relays 116 and 202. The relay 116 is deenergized after an interval of time to open the circuit of the magnet 147, thus permitting this magnet to advance the wipers 143 to 146, inclusive, into engagement with their first set of bank contacts.

The slow-releasing relay 202, at the substation, is also deenergized after an interval of time to open the circuit of the magnet 210, thereby permitting it to advance the wipers 211 to 213, inclusive, into engagement with their first set of bank contacts.

It is also possible that the wipers 211 to 213, inclusive, of the selector switch RS—1 will engage their twenty-fifth set of bank contacts before the wipers of the rotary switch RS engage their twenty-fifth set of bank contacts. In this case, the relay 203 is operated and, upon the deenergization of the slow-acting relay 230, a circuit is completed extending from ground by way of the back contact and armature 231, front contact and armature 218, winding of slow-acting relay 202, trunk conductor 182, winding of relay 115, bank contact with which wiper 146 is in engagement, and said wiper to battery. The relays 202 and 115 are energized over this circuit.

Upon operating, the relay 115, at armature 139, establishes a circuit for the magnet 147 and, at armature 140, completes a circuit for the slow-release relay 117. The relay 117, upon operating, at armature 142 prepares a circuit for the magnet 147. The magnet 147 interrupts its own circuit and operates as a buzzer to advance the wipers 143 to 146, inclusive, into engagement with the twenty-fifth set of bank contacts. When this occurs the circuit of the relay 115 is opened, as is the circuit of the slow-acting relay 202.

By the retraction of the armature 140 of the relay 115, a circuit is completed for the stepping magnet 147 and the circuit of the relay 117 is opened. The slow-acting relay 117 is deenergized after an interval of time, and the circuit of the stepping magnet 147 is opened. The magnet 147 operates to advance the wipers 143 to 146, inclusive, into engagement with their first set of bank contacts.

The slow-releasing relay 202, upon being deenergized, opens the circuit of the stepping magnet 210 and this magnet is deenergized to advance the wipers 211 to 213, inclusive, into engagement with their first set of bank contacts.

By the above circuit arrangement, the wipers 143 to 146, inclusive, and the wipers 211 to 213, inclusive, continue to rotate in synchronism.

At the substation, when the switch wipers 211 to 213, inclusive, are brought into engagement with their fifth set of bank contacts, a circuit is completed extending from ground by way of wiper 212, fifth bank contact, and winding of relay 205 to battery. The relay 205 is energized over this circuit and operates, at armature 221, to complete a circuit for the electromagnet 9 in the sending meter. The electromagnet 9 energizes to connect the voltage divider 12 over a circuit extending by way of the collector bar 11, contact making member 4, fifth bank contact, wiper 211, conductor 180, wiper 143, and fifth bank contact, and the coil of the armature of the repeating meter 2 to ground.

The operation of the wiper 144 of the rotary switch RS into engagement with its fifth bank contact completes a circuit for the electromagnet 20. The electromagnet 20 is energized to withdraw the armature 19 from engagement with the rack 23, thereby permitting the pointer 17 to move under the control of the armature of the meter device 2. The pointer of this meter now assumes a position corresponding to the indication of the meter 1 at the substation.

When the wipers of the rotary switches RS and RS—1 advance to the next step, the above traced circuits are opened, the electromagnet 9 being deenergized to permit the arm 4 to move freely and the electromagnet 20 being deenergized to retain the pointer 17 in its operated position.

When the repeating device 50 is connected with the sending meter 251 in the subsequent operation of the selector switches, the indication is sent in the manner described. It will be seen that each time the switch wipers rotate, the sending device 1 is connected with the receiving device 2 and, consequently, at each rotation of the switch wipers, the meter indications are checked.

When the rotation of the switch wipers of the rotary switches RS and RS—1 is initiated by the operation of the key K—3, their rotation continues indefinitely until the key K—2 is depressed. By the operation of the key K—2 the locking circuit of the relay 113 is opened and one point in the circuit of the relay 114 is opened at armature 129. If there are no relays, such as 111 and 112, energized at this time, the rotation of the switch wipers will cease. When meter indications are being obtained, it is ordinarily desirable that the switch wipers continue to rotate and, consequently, the key K—3 is the one ordinarily operated. However, the throwing of a key, such as K—1, in one direction or the other, will bring about the initiation of the rotation of the switch wipers of the rotary switches RS and RS—1 upon the energization of relays, such as 111 and 112. In this event, of course, it will be obvious that the rotation of these switch wipers will cease when the proper apparatus unit at the distant station has been operated and an answer-back signal indicative of its operation obtained at the dispatcher's office.

The dispatcher may also desire to operate the circuit breaker C in the substation in order to effect any circuit change thereat that he desires. In order to accomplish this result, the dispatcher will operate key K—1 in such direction as to force the spring 190 into engagement with its working contact, causing the relay 112 to be energized, thus placing a ground potential upon bank contact 151 at armature 126. Other results of the operation of the relay 112 are that at armature 128 a locking circuit is established for the relay 112 that extends from ground by way of armature 121 and its back contact, armature 128 and its front contact, and relay 112 to battery, and at armature 127 an additional point is closed in the circuit of the stepping relay 114.

When the switch wipers of the rotary switch RS are brought into engagement with the set of bank contacts including bank contact 151, the switch wipers of the rotary switch RS—1 will be in engagement with the set of bank contact which includes the bank contact 252.

A circuit is now completed extending from ground by way of armature 126 and its front contact, bank contact 151, wiper 143, trunk conductor 180, wiper 211, bank contact 252, and winding of relay 207 to battery. The relay 207 is energized over this circuit and operates to complete a circuit for the closing coil of circuit breaker C. The circuit breaker C is now closed. By the closure of the circuit breaker C, the switch 253 connects ground to the bank contact 254 in the rotary switch RS—1.

Now, when the wipers 211 to 213, inclusive, engage the bank contact set including the contact 254, the wipers 143 to 146, inclusive, will be in engagement with the set of bank contacts including the contact 152. A circuit is now completed extending from ground by way of switch 253, bank contact 254, wiper 211, conductor 180, wiper 143, bank contact 152, winding of relay 110, and resistor 122 to battery.

The relay 110 is energized over the above circuit and operates to establish a locking circuit for itself at armature 121 and to open the locking circuit of the relay 112, thereby removing ground from the bank contact 151. Another result of the operation of the relay 110 is that the lamp 118 is extinguished and the lamp 119 is lighted. By this operation, the dispatcher is informed of the operation of the circuit breaker C.

While only one circuit breaker has been shown, it will be understood that more may be controlled and supervised in the manner described.

In the event that the circuit breaker C does not operate properly, or that the proper indication is not sent back, the current potential will not be removed from the bank contact 151 and the sending operation will continue to be transmitted until the devices operate properly.

The dispatcher is also able, by means of a double-throw key, such as the key K shown, to operate the induction regulator at the substation either to raise or to lower the voltage on the circuit 250.

Assuming that the dispatcher desires to lower the voltage on the circuit 250, he will operate the key provided in the proper direction. By this operation, a ground potential is placed upon a bank contact in the selector switch RS. When the wipers of the rotary switch RS engage this set of bank contacts, it being understood that the operation of the rotary switches is continuous in view of the fact that the key K—3 is the one that has been depressed, the wipers 211 to 213, inclusive, of the switch RS—1 at the substation will be in engagement with the bank contact set including the bank contact 255.

The relay 208 is now energized and a circuit is closed for the motor of the induction regulator. This now operates to lower the voltage in the usual manner. The voltage will be lowered in a step-by-step manner, that is, the circuit of the relay 208 will remain closed until the dispatcher releases the key at the dispatcher's office, or until the circuit is broken by the operation of the switch wipers, it being understood that the wipers are continuously rotated by reason of the fact that the relay 113 is maintained energized. By observing the indication of the meter 2, the dispatcher is able to ascertain when the correct voltage has been reached. Although the relays 208 and 209 are only momentarily energized, this momentary energization is periodic and continuous until the meter reading indicates sufficient operation, after which the dispatcher operates his key K—2 to stop the switches.

In the event that the dispatcher desires to raise the voltage on the circuit 250, this result may be accomplished by operating the key K provided in the opposite direction to that described. This result causes the operation of the relay 209 at the substation, whereby the current flows through the motor of the induction regulator in the opposite direction to that previously described and the voltage on the circuit 250 is raised.

If the dispatcher, at any time when no operation is being performed, desires to stop the operation of the rotary switches RS and RS—1, he may operate the key K—2, whereby the locking circuit of the relay 113 is opened and this relay is deenergized to open the circuit of the slow-acting relay 114. This is usually performed when the wipers are on normal contact, although the wipers can be stopped at any point. Upon the next operation of the key, the switches then start in the same manner as has been before described.

In the above operation of the system, the manner in which the voltage on a particular circuit at the substation is sent back to the dispatcher's office has been described. However, it will be obvious that the measurement of any quantity at the substation may be transmitted to the dispatcher's office in a similar manner.

My invention is not limited to the particular arrangement of the apparatus illustrated, but may be variously modified without departing from the spirit and scope of my invention, as set forth in the appended claims.

I claim as my invention:

1. In a supervisory control system, a first station, a second station, apparatus units at said second station, distributors at each station, measuring devices at said second station, a repeating device at said first station individual to each measuring device, means whereby said apparatus units are controlled over said distributors from said first station, means whereby any one of said repeating devices is controlled by its associated measuring device over said distributors and means whereby said distributors are operated to each position thereof from said first station.

2. In a supervisory control system, a first station, a second station, an electrical circuit at said second station, an induction regulator for varying the characteristics of said circuit, distributors at each of said stations, having a plurality of selecting contacts, means for operating said distributor in synchronism, means including contacts of said distributor for controlling the operation of said induction regulator from said first station, a metering device connected to said electrical circuit, a repeating device individual thereto, means including contacts at one position of said distributors for operating said repeating device in accordance with the operation of said metering device, and means whereby said induction regulator is variably operated from said first station in steps through said first mentioned contacts of said distributors for each rotation of the distributors.

3. In a remote-control and metering system, a first station, a second station, apparatus units at said second station, a selector switch at each station, each having a plurality of selecting positions, means for operating the switches in synchronism, a measuring device at said second station, a repeating device for said measuring device at said first station, means whereby said apparatus units are selectively controlled over certain positions of said selector switches from said first station, means whereby said repeating device is operated over another of said selecting positions under control of said measuring device to reproduce the readings of said measuring device and means, including said synchronous operating means, for starting and stopping said selectors at and from any one of said selecting positions.

4. In a supervisory control system, a first station, a second station, selectors at each of said stations, each having a plurality of selecting positions, means for operating the selectors in synchronism, metering devices at said second station, said metering devices having individual positions on said selectors at said second station, repeating devices at said first station individual to said metering devices, each of said individual repeating devices having an equivalent position on said selector at said first station, means, including said selectors, for associating one of said metering devices with its individual repeating device and means, including the operating means, for bringing said selectors to a stop at any position for an indefinite period of time under control from said first station.

5. In a supervisory control system, a first station, a second station, normally non-operating selectors at each of said stations, each having a plurality of positions, metering devices at said second station, each of said metering devices being associated with an individual position on said selector at said second station, repeating devices at said first station individual to each of said metering devices associated with corresponding selecting positions on said first station selector, means at said first station for starting selectors into operation, means for operating said selectors in synchronism, means, including said selectors, for associating any one of said metering devices with its associated repeating device and means at said first station for stopping said selectors at any position for an indefinite period of time.

6. In a signalling system, a first station, a second station, a plurality of apparatus units at said second station, a signalling device individual to each of said apparatus units at said first station, a measuring device at said second station, a repeating device at said first station, a step-by-step selector switch at each of said stations, means, including said first station selector switch, for controlling the operation of said second station selector switch in synchronism therewith, means, including said selector switches, for selectively operating any one of said apparatus units from said first station, means, including said selector switches and responsive to the operation of any one of said apparatus units, for operating the signalling device individual to said unit, means, including said selector switches, for operating the repeating device in accordance with the operation of said measuring device and means at said first station for bringing said selector switches to a stop at any position for an indefinite period of time.

7. In a supervisory control system, a first station, a second station, a plurality of apparatus units at said second station, signalling devices individual to each of said apparatus units at said first station, a distributor switch at each of said stations, said apparatus units having an individual position on said distributor switch at said second station and said signalling devices having individual positions on said distributor switch at said first station, means at said first station for starting said distributors into operation, means, including said first station distributor switch, for operating said second station distributor switch in synchronism therewith, means, including said distributors when on a position individual to an apparatus unit, for selectively controlling said unit from said first station, and means, including said distributors when on the position individual to the associated signalling device, for said apparatus unit for operating said signalling device in accordance with the operation of said apparatus unit and for simultaneously bringing said distributors to a stop.

8. In a supervisory control system, a first station, a second station, apparatus units at said second station, a selector switch at each station, a measuring device at said second station for each of a plurality of selecting positions of said selectors, a repeating device at said first station, individual to each measuring device, means whereby said apparatus units are controlled over said selector switches from said first station, means whereby any one of said repeating devices is controlled by its associated measuring device over the selecting position of said selector switches, and means for actuating the selectors to each selecting position, said last-mentioned means being controlled from said first station.

In testimony whereof, I have hereunto subscribed my name this third day of April, 1924.

JUDSON O. SHEPHERD.